US008583627B1

(12) United States Patent
Kamvar et al.

(10) Patent No.: US 8,583,627 B1
(45) Date of Patent: Nov. 12, 2013

(54) DISPLAY-CONTENT ALTERATION FOR USER INTERFACE DEVICES

(75) Inventors: Maryam Kamvar, San Francisco, CA (US); Shumeet Baluja, Santa Clara, CA (US); Cedric Beust, San Francisco, CA (US); Elad Gil, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1422 days.

(21) Appl. No.: 11/172,639

(22) Filed: Jul. 1, 2005

(51) Int. Cl.
*G06F 7/00* (2006.01)
(52) U.S. Cl.
USPC .......................................................... 707/716
(58) Field of Classification Search
USPC ....................................... 707/102, 104.1, 716
See application file for complete search history.

(56) References Cited

U.S. PATENT DOCUMENTS

| | | | | |
|---|---|---|---|---|
| 6,758,394 | B2 * | 7/2004 | Maskatiya et al. | 235/379 |
| 7,039,875 | B2 * | 5/2006 | Khalfay et al. | 715/762 |
| 2002/0133566 | A1 * | 9/2002 | Teeple | 709/218 |
| 2003/0053091 | A1 * | 3/2003 | Tanaka et al. | 358/1.9 |
| 2003/0169293 | A1 * | 9/2003 | Savage | 345/762 |
| 2004/0017393 | A1 * | 1/2004 | Easwar | 345/744 |
| 2004/0090464 | A1 * | 5/2004 | Shake et al. | 345/773 |
| 2004/0203854 | A1 * | 10/2004 | Nowak | 455/456.1 |
| 2004/0205715 | A1 * | 10/2004 | Taylor | 717/120 |
| 2004/0225922 | A1 * | 11/2004 | Susarla et al. | 714/38 |
| 2005/0240391 | A1 * | 10/2005 | Lekutai | 704/2 |
| 2005/0261891 | A1 * | 11/2005 | Chan et al. | 704/9 |
| 2006/0048051 | A1 * | 3/2006 | Lazaridis | 715/517 |
| 2006/0059418 | A1 * | 3/2006 | Elkady | 715/508 |
| 2006/0200767 | A1 * | 9/2006 | Glaeske et al. | 715/700 |
| 2006/0250834 | A1 * | 11/2006 | Chinn et al. | 365/63 |
| 2006/0294476 | A1 * | 12/2006 | Buckley | 715/781 |

OTHER PUBLICATIONS

OMA Open Mobile Alliance, OMA Enabler Releases and Specifications—OMA Browsing V2.3 Candidate Enabler, http://www.openmobilealliance.org/release_program/browsing_v23.html, Copyright 2002, [retrieved from internet on Jun. 6, 2005], pp. 1-2.
OMA Open Mobile Alliance, OMA Enabler Releases and Specifications—OMA Browser Protocol Stack 2.1 Candidate Enabler, http://www.openmobilealliance.org/release_program/browser_protocol_v21.html, Copyright 2002, [retrieved from internet on Jun. 6, 2005], pp. 1-2.
OMA Open Mobile Alliance, WV-040 System Architecture Model, Approved Version 1.2—Jan.25, 2005, pp. 1-15.
OMA Open Mobile Alliance, User Agent Profile, http://www.openmobilealliance.org/copyright.html, Version 20—May 2003, pp. 1-47.
W@P Wireless Application Forum, WMLScript Specification, http://www.wapforum.org/docs/copyright.htm, Version 25—Oct. 2000, pp. 1-136.

(Continued)

*Primary Examiner* — Truong Vo
(74) *Attorney, Agent, or Firm* — Fish & Richardson P.C.

(57) ABSTRACT

Systems and processes for data presentation may be implemented with a variety of operations and techniques. In particular aspects, a system and process for data presentation may include the ability to receive a data request at a data distribution device and determine data responsive to the data request, the responsive data including textual data. The system and process may also include the ability to modify the textual responsive data based on a user interface for visually presenting the textual responsive data and generate a data response including the modified textual responsive data.

6 Claims, 5 Drawing Sheets

(56) References Cited

OTHER PUBLICATIONS

W@P Wireless Application Protocol Forum, Wireless Application Environment Defined Media Type Specification, http://www.wapforum.org/what/copyright.htm, Version 15—May 2001, pp. 1-13.

W@P Wireless Application Protocol Forum, WAP-120-UACACH-20010413-a, http://www.wapforum.org/what/copyright.htm, Version 013—Apr. 2001, pp. 1-13.

W@P Wireless Application Protocol Forum, XHTML Mobile Profile, http://wapforum.org/what/copyright.htm, Version 29—Oct. 2001, pp. 1-17.

W@P Wireless Application Protocol Forum, Wireless Markup Language, http://www.wapforum.org/what/copyright.htm, Version 11—Sep. 2001, pp. 1-69.

OMA Open Mobile Alliance, Wireless Datagram Protocol Version 14 Jun. 2001, pp. 1-75.

OMA Open Mobile Alliance, OMA Release Program and Specifications, http://www.openmobilealliance.org/release_program/index.html, Copyright 2002, [retrieved from internet on Jun. 6, 2005], pp. 1-4.

OMA Open Mobile Alliance, OMA Enabler Releases and Specifications—OMA Browsing V2.3 Candidate Enabler, http://www.openmobilealliance.org/release_program/browsing_v23.html, Copyright 2002, [retrieved from internet on Jun. 6, 2005], pp. 1-2.

OMA Open Mobile Alliance, OMA Enabler Releases and Specifications—OMA User Agent Profile V2.0 Candidate Enabler, http://www.openmobilealliance.org/release_program/uap_v20.html, Copyright 2002, [retrieved from internet on Jun. 6, 2005], p. 1.

OMA Open Mobile Alliance, OMA Enabler Releases and Specifications—OMA Browser Protocol Stack 2.1 Candidate Enabler, http://www.openmobilealliance.org/release_program/browser_protocol_v21.html, Copyright 2002, [retrieved from interne on Jun. 6, 2005], pp. 1-2.

OMA Open Mobile Alliance, WV-040 System Architecture Model, Approved Version 1.2-Jan. 25, 2005, pp. 1-15.

OMA Open Mobile Alliance, User Agent Profile, http://www.openmobilealliance.org/copyright.html, Version May 20, 2003, pp. 1-47.

W@P Wireless Application Forum, WMLScript Specification, http://www.wapforum.org/docs/copyright.htm., Version 25-Oct. 2000, pp. 1-136.

OMA Open Mobile Alliance, OMA Service Environment, Approved Version 1.0—Sep. 7, 2004, pp. 1-32.

W@P Wireless Application Protocol Forum, Wireless Application Environment Defined Media Type Specification, http://www.wapforum.org/what/copyright.htm, Version 15-May 2001, pp. 1-13.

W@P Wireless Application Protocol Forum, HTTP State Management Specification, http://www.wapforum.org/docs/copyright.htm, Dec. 13, 2000, pp. 1-13.

W@P Wireless Application Protocol Forum, WAP-120-UACACH-20010413-a, http://www.wapforum.org/what/copyright.htm, Version 013-Apr. 2001, pp. 1-13.

W@P Wireless Application Protocol Forum, XHTML Mobile Profile, http://wapforum.org/what/copyright.htm, Version 29-Oct. 2001, pp. 1-17.

W@P Wireless Application Protocol Forum, WAP WML WAP-191-WML, http://wapforum.org/what/copyright.thm, Feb. 19, 2000, pp. 1-110.

W@P Wireless Application Protocol Forum, Wireless Markup Language, http://www.wapforum.org/what/copyright.htm, Version 11-Sep. 2001, pp. 1-69.

OMA Open Mobile Alliance, Wireless Transaction Protocol, Version 27 Aug. 2002, pp. 1-75.

OMA Open Mobile Alliance, Wireless Profiled TCP, Version 31 Mar. 2001, pp. 1-18.

OMA Open Mobile Alliance, Wireless Profiled HTTP, Version 31 Oct. 2001, pp. 1-16.

OMA Open Mobile Alliance, Wireless Datagram Protocol, Version 14 Jun. 2001, pp. 1-75.

Office Action issued in U.S. Appl. No. 13/919,826, filed Aug. 21, 2013, 17 pages.

* cited by examiner

DISPLAY-CONTENT ALTERATION FOR USER INTERFACE DEVICES

BACKGROUND

Users of mobile devices (e.g., cell phones) often desire to retrieve data (e.g., Web pages) from a centralized computer (e.g., a server). A common technique for a mobile device to retrieve data from a centralized computer is to generate and send a data request that causes a connection to be established between the mobile device and the centralized computer. The centralized computer may then assemble the data that is responsive to the data request and send the data to the mobile device in a data response. The mobile device can present the data to a user once the data arrives.

Unfortunately, mobile devices often have relatively limited display sizes. For example, while many personal computer displays are about seventeen inches in diagonal, many mobile device displays are about four inches in diagonal. Thus, if a centralized computer sends a data response to a mobile device that is typically sent to a personal computer, the data will typically fill many display screens. The user, however, is typically still able to access the data by using a scrolling technique. Of course, the responsive data could be so large that it would even overflow a personal computer display.

SUMMARY

Altering display content for user interface devices may be accomplished by a variety of systems and techniques. In one general aspect, a technique for a data distribution device may include the ability to receive a data request and determine data responsive to the data request, the responsive data including textual data. The data request may, for example, include a search request embodied in a Hypertext Transfer Protocol request. The technique may also include the ability to modify the textual responsive data based on a user interface for visually presenting the textual responsive data and generate a data response including the modified textual responsive data.

Determining responsive data may include identifying data associated with the data request and analyzing the identified data for textual data. Modifying the textual responsive data based on a user interface for visually presenting the textual responsive data may include modifying a plurality of portions of the textual responsive data based on user interface display characteristics. Modifying a plurality of portions of the textual responsive data may include summarizing at least one portion and/or truncating at least one portion so the portion occupies no more than a predetermined amount of user interface space (e.g., a number of user interface textual rows).

Modifying the textual responsive data based on a user interface for visually presenting the textual responsive data may include determining one or more user interface display characteristics. The one or more user interface display characteristics may include at least one of user interface height, user interface width, font height, and font width. Determining one or more user interface display characteristics may include reading at least one display characteristic from the data request. Modifying the textual responsive data based on a user interface for visually presenting the textual responsive data may also include reducing the textual responsive data based on user interface memory.

In another general aspect, a data distribution apparatus includes a communication interface, memory, and a processor. The communication interface is operable to receive a data request and to convey a data response. The memory is coupled to the communication interface and operable to store instructions and data. The processor is coupled to the memory and operable according at least in part to the instructions to determine that a data request has been received, determine data responsive to the data request, the responsive data including textual data, modify the textual responsive data based on a user interface for visually presenting the textual responsive data, and generate a data response including the modified textual responsive data.

The processor may modify a plurality of portions of the textual responsive data based on user interface display characteristics to modify the textual responsive data based on a user interface for visually presenting the textual responsive data. Modifying a plurality of portions of the textual responsive data may include summarizing at least one portion and/or modifying at least one portion so that it occupies no more than a predetermined amount of user interface space.

The processor may also determine one or more user interface display characteristics to modify the textual responsive data based on a user interface for visually presenting the textual responsive data. The processor may further reduce the textual responsive data based on user interface memory to modify the textual responsive data based on a user interface for visually presenting the textual responsive data.

In a particular aspect, a process performed at a data distribution device includes receiving a Hypertext Transfer Protocol (HTTP) request including a data search request and at least one display characteristic for a user interface for displaying data responsive to the data search request and determining data responsive to the data search request, the responsive data including textual data. The process also includes determining one or more user interface display characteristics by reading at least one user interface display characteristic from the HTTP request, reducing a plurality of portions of the textual responsive data based on the one or more user interface display characteristics and a predetermined amount of user interface space for each portion, and generating a data response including the reduced textual responsive data.

Various implementations may include one or more features. For example, the ability to take into account the user interface on which responsive data will be displayed may enhance the user experience. For instance, this ability may provide the user of a user interface device with limited display size the ability to quickly scan over a list of search results. Moreover, this ability may even be useful for user interface devices that have an effective scrolling mechanism, because users may find scrolling over more than a few display screens to be excessive, wearisome, and/or confusing. As another example, taking into account the user interface on which data will be displayed may lead to less data being conveyed to the user interface device, which may conserve communication network bandwidth and/or user interface device resources. As a further example, the data to be conveyed may be determined dynamically in response to a data request. Thus, as the responsive data changes (e.g., shrinks or grows), the conveyed data may also change. Moreover, if characteristics of the user interface change (e.g., available fonts), the conveyed data may also change. As an additional example, while some techniques have particular applicability to wireless devices, the general concepts are not so limited.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Systems and techniques for data presentation may include the ability to provide data to a remote presentation device from a centralized computer in response to a data request. In particular implementations, a system and technique may include the ability to modify data responsive to a data request based on user interface characteristics that will affect the presentation of the responsive data. The modifications may be performed at the centralized computer and/or the remote presentation device. Other implementations may include fewer or additional operations.

Figure 1:
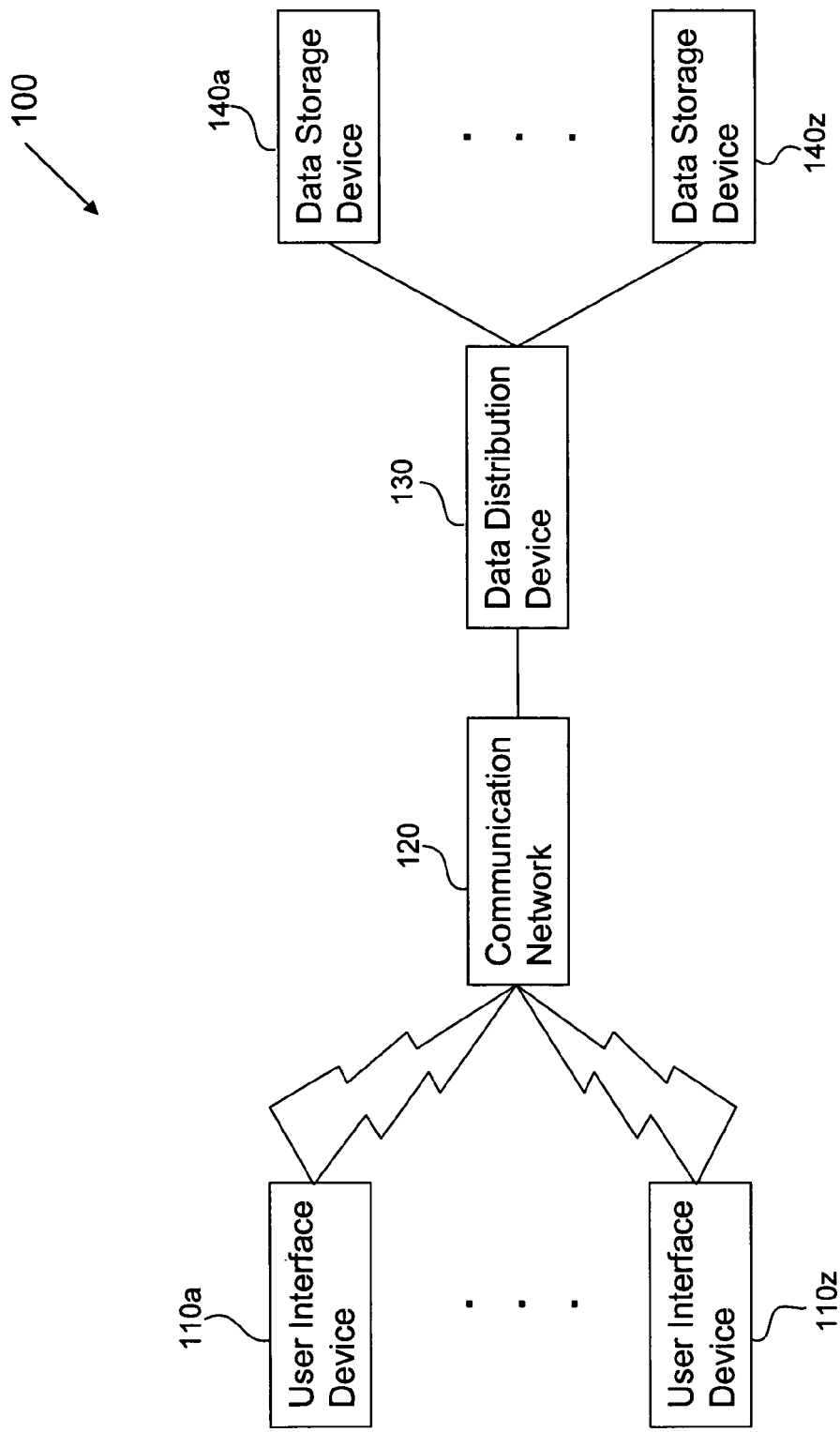
FIG. 1 is a block diagram illustrating one implementation of a system for data presentation.

FIG. 1 illustrates one implementation of a system 100 for data presentation. System 100 includes user interface devices 110, a communication network 120, a data distribution device 130, and data storage devices 140. In one mode of operation, an interface device 110 requests data from data distribution device 130 through communication network 120. In response, data distribution device 130 assimilates the data responsive to the data request and determines how to modify textual responsive data for presentation in a user interface of the user interface device based on one or more display characteristics of the user interface. The data distribution device then conveys the modified responsive data to the appropriate one of user interface devices 110. Upon receiving the modified responsive data, the user interface device presents the data.

In more detail, user interface devices 110 may be cellular telephones, personal digital assistants (PDAs), or any other appropriate apparatuses for sending, receiving, and presenting information. The user interface devices may include a processor (e.g., a microprocessor) operating under a set of logical instructions (e.g., a program)—which may be stored on the processor, in memory (e.g., random-access memory (RAM)), or a combination of the two—and a communication interface (e.g., a wireless transceiver). The user interface devices may also include any appropriate information presentation device (e.g., a monitor).

As illustrated, user interface devices 110 communicate with communication network 120, and, hence, data distribution device 130, by using wireless techniques. Examples of wireless techniques to send data to communication network 120 include General Packet Radio Service (GPRS), IEEE 802.11, and CDMA2000. The user interface devices may communicate with data distribution device 130 using any appropriate protocol (e.g., Hypertext Transfer Protocol (HTTP) or User Datagram Protocol (UDP)). Although illustrated as communicating with communication network 120 by wireless techniques, user interface devices 110 may also communicate with the communication network using wireline techniques, either in addition to or exclusive of the wireless techniques.

Communication network 120 may be any appropriate type of system for conveying information. As illustrated, communication network 120 communicates with user interface devices 110 through wireless techniques and data distribution device 130 through wireline techniques (e.g., TCP/IP over twisted-pair wire or SONET over fiber-optic cable). Internally, communication network 120 may use wireless techniques, wireline techniques, or a combination thereof. Communication network 120 may include any combination of repeaters, hubs, bridges, routers, switches, multiplexers, and the like for effecting information conveyance. In certain implementations, communication network 120 may communicate with user interface devices 110 and data distribution device 130 using wireline and/or wireless techniques.

Data distribution device 130 may be any appropriate apparatus for receiving an information request, assimilating responsive information, and conveying the information. In particular implementations, data distribution device 130 may be a server (e.g., a file server, a data server, or a Web server), and user interface devices 110 and data distribution device 130 may enter into a client-server relationship to convey data between them. To assimilate data to be conveyed, data distribution device 130 may access its own storage for at least part of the data, compute at least part of the data, and/or access data storage devices 140 for at least part of the data.

Data storage devices 140 store data that may be accessed by data distribution device 130. Data storage devices 140 may store text, graphics, audio, video, instrumentation measurements, computational results, and/or any appropriate type of information. The data may be organized in any appropriate manner (e.g., databases, files, or Web pages). Data storage devices 140 may communicate with data distribution device 130 through any appropriate type of communication network (e.g., a local-area network (LAN), a wide-area network (WAN), or the Internet).

In one mode of operation, when one of user interface devices 110 determines that it needs data, perhaps in response to a user request, the user interface device generates a data request for data distribution device 130. The data request may, for example, be an HTTP request. The user interface device then sends the data request to communication network 120, which conveys it to data distribution device 130.

Upon receiving the data request, data distribution device 130 identifies, assimilates, and assesses data that is responsive to the data request. The data may, for example, reside on data distribution device 130 and/or one or more of data storage devices 140. Data storage devices 140 typically do not know anything about the user interface device requesting the data and, hence, simply return as much data as possible in response to a data distribution device inquiry. The data distribution device may then assess the responsive data.

In assessing the responsive data, the data distribution device may determine whether any textual data is responsive to the data request and, if so, whether to modify the textual data. Typically, a user of a interface device only wants to scroll a given amount in reviewing data. Thus, presenting all of the textual responsive data may be cumbersome to the user. The data distribution device may take user interface characteristics into account in determining whether, and if so how, to modify the responsive data.

For example, the data distribution device may rely on characteristics such as size of display, font metrics, and memory constraints. For instance, based on display size and font metrics, the data distribution device may understand how much textual data may be presented in the user interface. From this, the data distribution device may modify the amount of the textual responsive data.

If the user requests search results for a query, for example, the data distribution device may assimilate Web page descriptions (e.g., Web page titles and snippets of information about the content in the Web pages). The data distribution device may then decide to return a certain number of Web page descriptions (e.g., ten) in the data response as the search result. Moreover, of the Web page descriptions returned, the textual data describing the Web pages may be modified so that it only consumes a predetermined amount of the user interface (e.g., two textual rows). Thus, if the user interface can present four lines of textual data, a search result that returns ten Web page descriptions would not fill more than five display screens.

To determine how to modify the textual data, the data distribution device may use a variety of techniques. For example, the data distribution device may truncate a sufficient amount of textual data to conform to user interface space requirements. As another example, the data distribution device may use text summarization to remove a sufficient amount of textual data. The summarization may take as a parameter the display characteristics, and output the most informative snippet that fits into the specified constraints. An informative snippet for a document, for example, could be formed from the most relevant paragraph, the first sentence of each paragraph, or the most relevant sentence. As a further example, the data distribution device could even decide to remove portions of the textual data that are too long (e.g., a Web page link). The removed data could be represented by a graphic symbol, the selection of which could allow additional responsive data regarding the Web page to be retrieved and presented. The modifications may, for example, be performed on portions of the textual responsive data (e.g., each Web page description) and/or on sub-portions of each portion (e.g., snippets about the Web pages).

Also, for the textual data that is retained, portions of textual data may be formatted for the user interface. For example, a portion of the retained or deleted textual data may be represented by an additional data indication (e.g., ellipses), which could further conserve space. For instance, a long Web address (e.g., "http://hyperphysics.phy-astr.gsu.edu/hbase/electronic/etroncon.html#c1") could be represented by a portion of the Web address (e.g., "http://hypemhysics.phy-astr.g-su.edu/ . . ."), especially for a response that includes a variety of different Web sites. As another example, a decision could be made as to where to place and/or break text (e.g., a word or phrase) that will take up more than the remaining space on a textual line, which could improve clarity and/or readability.

As another example of determining whether to modify textual responsive data, the data distribution device may rely on user interface memory constraints. For instance, there is often a harsh run-time memory limitation on certain cellular telephones. Thus, some user interface devices can only handle a certain amount of data to be stored in run-time. The data distribution device could take this into account when determining the data to place in the data response, to keep the data's size under user interface device memory limitations.

One or more user interface characteristics (e.g., display size, font size, and/or memory size) may be conveyed to the data distribution device before, with, or after the data request. Furthermore, certain user interface characteristics (e.g., font sizes) may vary not only by user interface device type, but by program and operating system on a user interface device type. Thus, an indication of these may also be provided.

The data distribution device may also determine one or more user interface characteristics based on an indication of the user interface device type. The data distribution device could also infer one or more user interface characteristics (e.g., from user-agent or other standard HTTP headers). The characteristics could, for example, be stored in a table that associates them with device type.

Upon receiving the responsive data, which may have been modified by data distribution device 130, the user interface device may present the data. The user interface device may also allow the user to indicate that additional data is required regarding a data portion (e.g., a web page associated with a web page description).

System 100 has a variety of features. For example, by taking into account the user interface on which responsive data will be displayed, the user experience may be enhanced. For instance, this may provide the user of a user interface device with limited display size the ability to be able to quickly scan over a list of search results. This may even be useful for user interface devices that have an effective scrolling mechanism, because users may find scrolling over more than a few display screens to be excessive, wearisome, and/or confusing. As another example, taking into account the user interface on which responsive data will be displayed may lead to less data being sent to the user interface device, which may conserve communication network bandwidth and user interface device resources. As a further example, the conveyed data is altered dynamically in response to a data request. Thus, as the responsive data changes (e.g., shrinks or grows), the conveyed data may also change. Moreover, if characteristics of the user interface change (e.g., available fonts), the conveyed data may also change. As another example, while system 100 has particular applicability to wireless user interface devices and the downloading and presentation of data (such as Web pages, search results, etc.) by wireless devices, the general concepts are not so limited.

In other implementations, the task of modifying the data for display by a user interface device could be performed in part or in whole by a user interface device, particularly if there are few memory and processing limitations at the user interface device. Thus, the user interface device could receive responsive data from the data distribution device and perform its own modifications. In fact, given enough computation power, bandwidth, and memory, all of the responsive data could be conveyed to the user interface device, and the user interface device could dynamically determine the responsive data to present.

Figure 2:
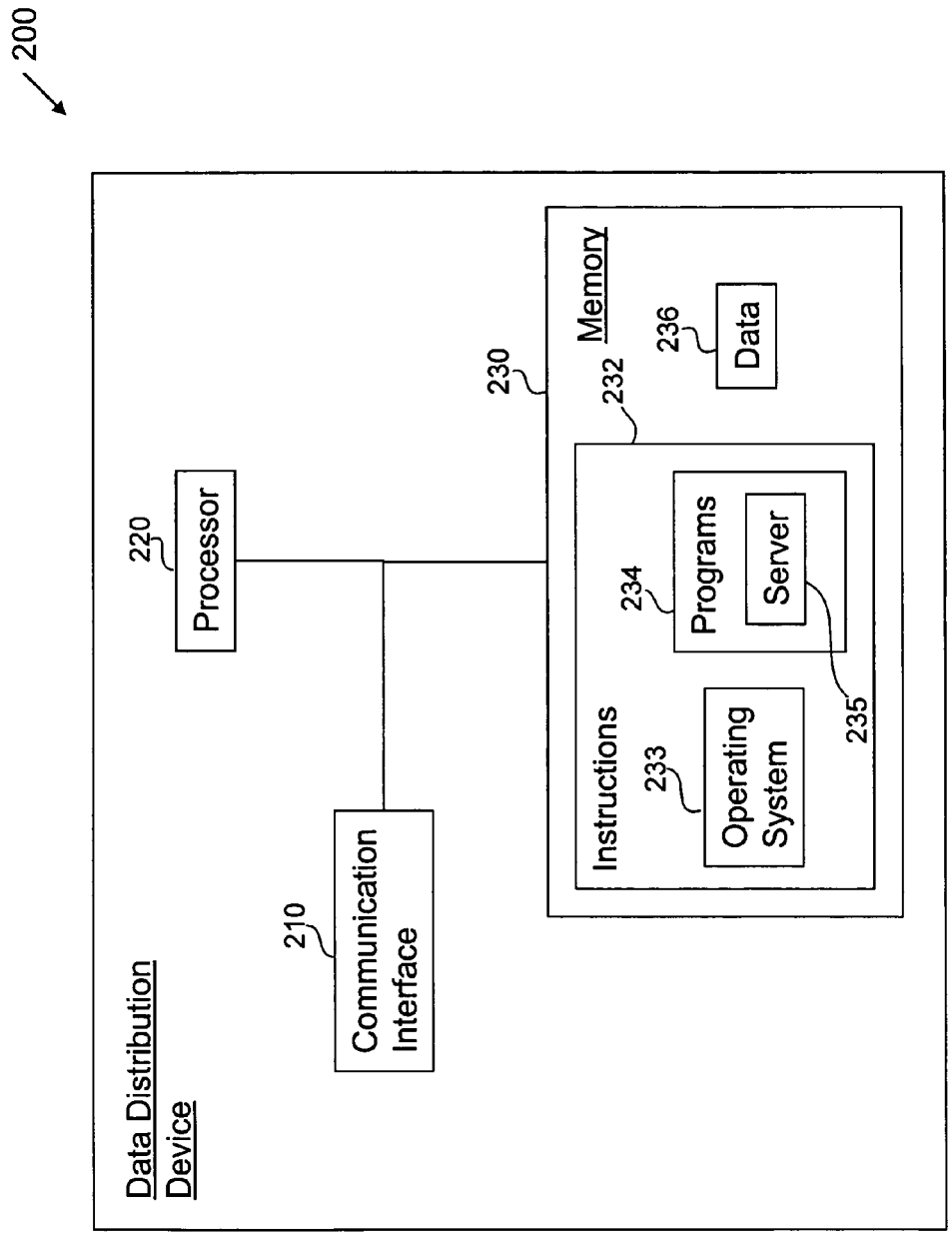
FIG. 2 is a block diagram illustrating one implementation of a data distribution device.

FIG. 2 illustrates one implementation of a data distribution device 200. Data distribution device 200 includes a communication interface 210, a processor 220, and memory 230. Data distribution device 200 may, for example, be one implementation of a data distribution device for system 100.

Communication interface 210 may be a network interface card (MC), a modem, or any other appropriate device for sending information by wireline and/or wireless techniques. Communication interface 210 may provide data distribution device 200 with the ability to communication with a communication network. Communication interface 210 may, for example, format communications from data distribution device 200 for conveyance over a communication link (e.g., by encapsulating the communication in a message format, by encoding the communication, and/or by modulating the communication).

Processor 220 is coupled to communication interface 210 and may be a microprocessor, a microcontroller, or any other appropriate device for manipulating information in a logical manner. Processor 220 may interpret communications (e.g., messages) received through communication interface 210 and generate communications for communication through communication interface 210.

Memory 230 is coupled to processor 220 and may include random-access memory (RAM), read-only memory (ROM), compact-disk read-only-memory (CD-ROM), and/or any other appropriate type of information storage device. As illustrated, memory 230 includes instructions 232 and data 236. Instructions 232 may dictate at least some of the operations of processor 220. In this implementation, instructions 232 include an operating system 233 (e.g., Unix, Linux, or Windows) and programs 234. Programs 234 include a server 235 (e.g., an HTTP server). Data 236 may include data received through communication interface 210 and data to be conveyed through communication interface 210.

In one mode of operation, data distribution device 200 may wait to receive a data request (e.g., an HTTP request) through communication interface 210. Upon receiving the data request, the data distribution device may determine data responsive to the data request. For example, the data distribution device may identify, assimilate, and analyze the responsive data, which may reside at the data distribution device or a data storage device.

Data distribution device 200 may then determine at least one display characteristic of a user interface for presenting the responsive data. The characteristic(s) may include user interface size, font size, and user interface memory. Determining the characteristic(s) may include reading one or more characteristics from the data request and/or retrieving one or more characteristics based on user interface device type.

The data distribution device may also modify the textual responsive data based on the user interface characteristic(s). Modifying the textual responsive data may, for example, include truncating a plurality of portions of the textual responsive data so that each portion fits with a predetermined user interface space (e.g., a number of textual rows). The data distribution device may then generate a data response including the modified textual data.

Figure 3:
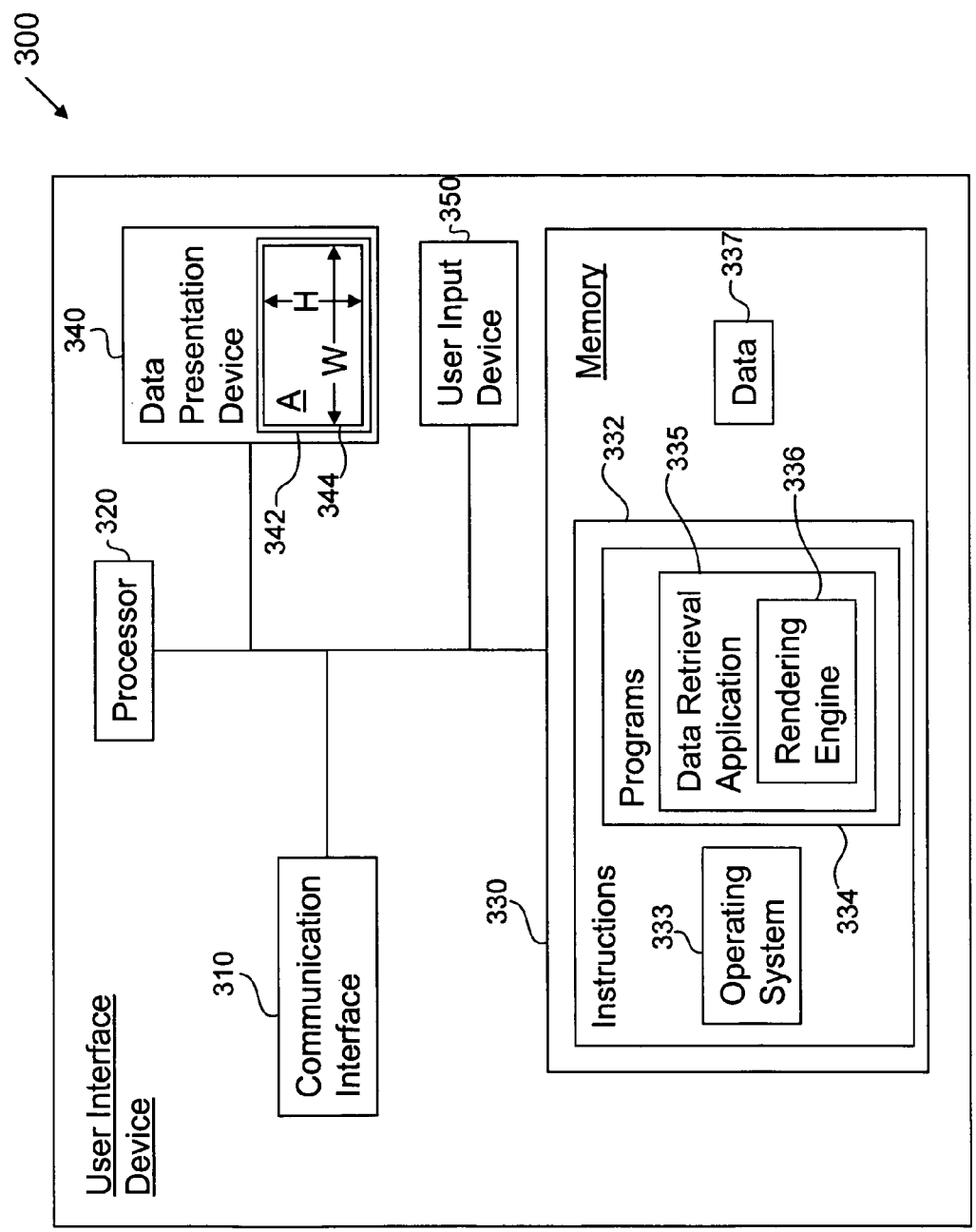
FIG. 3 is a block diagram illustrating one implementation of a user interface device.

FIG. 3 illustrates one implementation of a user interface device 300. User interface device 300 includes a communication interface 310, a processor 320, memory 330, a data presentation device 340, and a user input device 350. User interface device 300 may, for example, be one implementation of a user interface device for system 100.

Communication interface 310 may be a NIC, a modem, or any other appropriate device for sending information by wireline and/or wireless techniques. Communication interface 310 may provide user interface device 300 with the ability to communicate with a communication network. Communication interface 310 may format communications from user interface device 300 for communication over a communication link (e.g., by encapsulating the communication in a message format, by encoding the communication, and/or by modulating the communication).

Processor 320 is coupled to communication interface 310 and may be a microprocessor, a microcontroller, or any other appropriate device for manipulating information in a logical manner. Processor 320 may interpret communications (e.g., messages) received through communication interface 310 and generate communications for conveyance by communication interface 310.

Memory 330 is coupled to processor 320 and may include RAM, ROM, CD-ROM, and/or any other appropriate type of information storage device. As illustrated, memory 330 includes instructions 332 and data 337. Instructions 332 may dictate at least some of the operations of processor 320. Data 337 may include data received through communication interface 310 and data to be conveyed through communication interface 310. The data may include information received in response to a data request and/or information regarding making a data request.

In this implementation, instructions 332 include an operating system 333 (e.g., Unix, Linux, or Windows) and programs 334. Programs 334 include a data retrieval application 335 (e.g., a Web browser), which includes a rendering engine 336 for preparing graphical data for data presentation device 340. Data retrieval application 335 may, for example, define a structure for a graphical user interface, and rendering engine 336 may operate in accordance with hypertext markup language (HTML), extensible hypertext markup language (XHTML), wireless markup language (WML), compact hypertext markup language (CHTML), and/or any other markup language to prepare responsive data for the graphical user interface. Programs 334 could also include any of a variety of other appropriate applications (e.g., a word processing application, a database application, and an electronic mail application). If user interface device 300 is a PDA, instructions 332 may, for example, include Windows Mobile 2003 and pocket versions of Word, Excel, and Internet Explorer.

Data presentation device 340 is coupled to memory 330 and operable to present at least some of data 334. Data presentation device includes a display 342 that is operable to present a user interface 344 including data. User interface 344 may be a character-based interface, a graphic-based interface, or any other appropriate type of interface. As illustrated, user interface 344 has an area A for presenting information, defined by height H and width W. Data presentation device 340 may be a CRT monitor, an LCD monitor, or any other appropriate device for visually presenting information.

User input device 350 is also coupled to memory 330 and is operable to detect user input to user interface device 300. User input device 350 may include a keyboard, a keypad, a mouse, a stylus, a microphone, and/or any other appropriate device for detecting user interaction with user interface device 300.

In one mode of operation, user interface device 300 may begin making preparations for retrieving remote data before remote data is needed at the user interface device. For example, user interface device 300 may determine the characteristic(s) (e.g., size, available fonts, and available memory) of user interface 344 before determining that data is needed. Furthermore, the user interface device may convey the user interface characteristic(s) to a data distribution device. The characteristic(s) of a user interface may vary with operating system and/or program.

Once remote data is needed—for example, if a user requests data or if a program requires data, which may be in response to a user request—processor 320 may generate a data request, which may include a characteristic of user interface 344. The data request may be conveyed through communication interface 310, and a data response may be expected.

Upon detecting that a data response has been received through communication interface 310, the processor may extract the responsive data, if any, from the data response and prepare the data for presentation by data presentation device 330. Data presentation device 300 may then present the data to a user in user interface 344.

In certain modes of operation, user interface device 300 may also be able to manipulate the responsive data before presenting it. For example, processor 320 may have the ability to reduce the amount of textual responsive data by using summarization, truncation, substitution, and/or deletion techniques. Processor 320 may accomplish this based on the characteristics of user interface 344.

Figure 4:
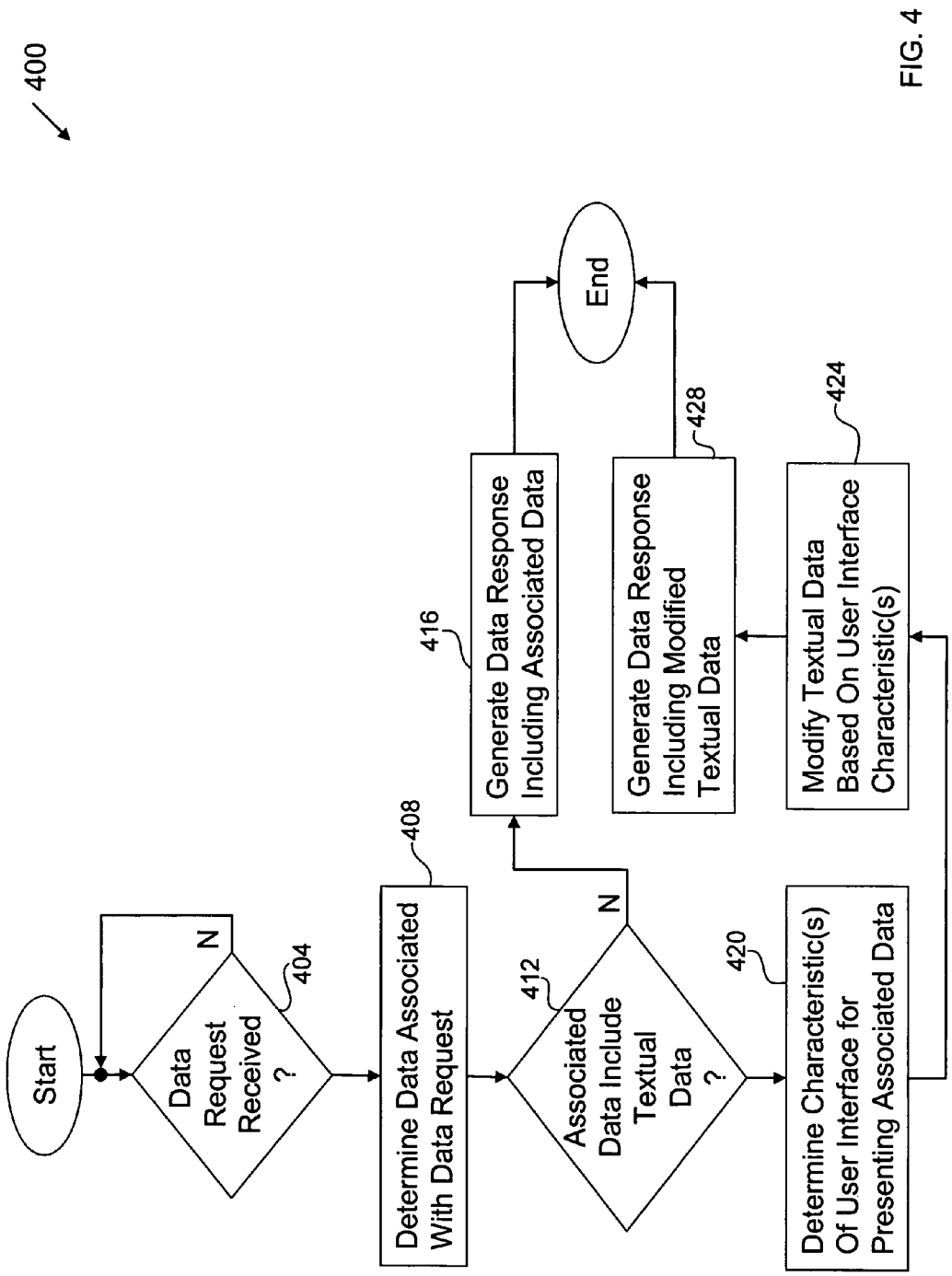
FIG. 4 is a flow chart illustrating one implementation of a process for data presentation.

FIG. 4 illustrates one implementation of a process 400 for data presentation. Process 400 may, for example, illustrate one mode of operation of a data distribution device of system 100.

Process 400 begins with waiting to receive a data request (operation 404). A data request may, for example, be an HTTP request including a search query. Upon receiving a data request, process 400 calls for determining data associated with the data request (operation 408). Determining data associated with the data request may, for example, include identifying associated data and assessing the associated data.

Process 400 continues with determining whether the associated data includes textual data (operation 412). If the associated data does not include textual data, process 400 calls for generating a data response including the associated data (operation 416). The process is then at an end.

If, however, the associated data does include textual data, process 400 calls for determining at least one characteristic of a user interface for presenting the associated data (operation 420). The characteristic(s) may include user interface size, font size, and/or user interface memory. Determining the characteristic(s) may include reading one or more characteristics from the data request and/or retrieving one or more characteristics based on user interface device type.

Process 400 continues with modifying the textual associated data based on the user interface characteristic(s) (operation 424). Modifying the textual associated data may, for example, include summarizing a plurality of portions of the textual associated data. Process 400 also calls for generating a data response including the modified textual data (operation 428). The process is then at an end.

Although FIG. 4 illustrates one implementation of a process for data presentation, other processes for data presentation may include fewer, additional, and/or a different arrangement of operations. For example, a process may not include determining whether the associated data includes any textual data. Responsive data may, for instance, inherently contain textual data. As another example, a process may include modifying the textual associated data after generating a data response including the textual associated data. As an additional example, a process may include determining the characteristic(s) of a user interface for presenting the data before receiving the data request. As a further example, a process may include assimilating the responsive data. As another example, one or more operations may be performed contemporaneously or even simultaneously.

Figure 5:
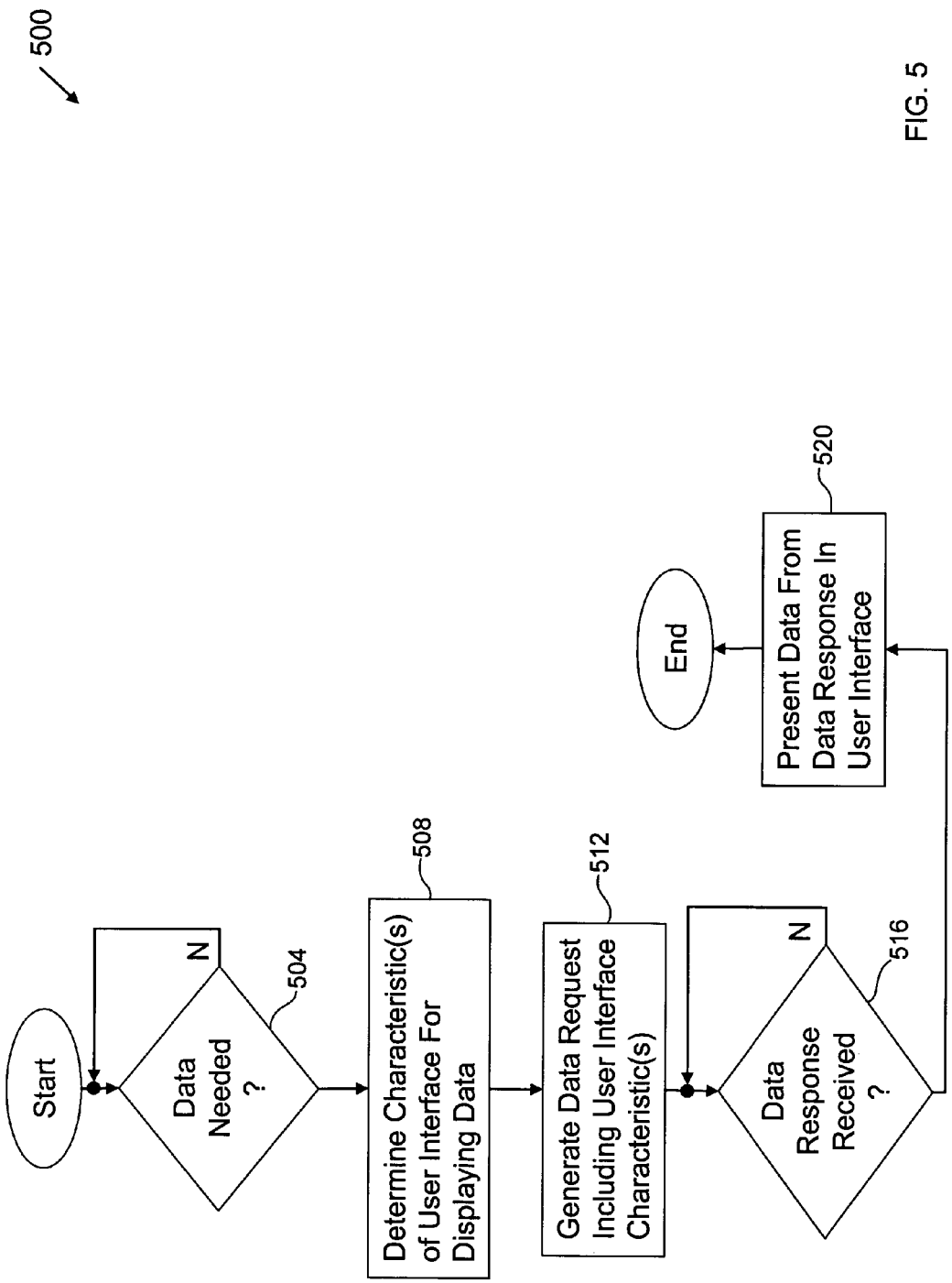
FIG. 5 is a flow chart illustrating another implementation of a process for data presentation.

FIG. 5 illustrates another implementation of a process 500 for data presentation. Process 500 may, for example, illustrate one mode of operation of a user interface device of system 100.

Process 500 begins with waiting until data is needed (operation 504). Data may be needed, for example, if a user requests data or if a program requires data, which may be in response to a user request. Once data is needed, process 500 calls for determining at least one characteristic of a user interface for displaying the data (operation 508). Determining a characteristic of a user interface for displaying the data may, for example, include retrieving it from a data store. The characteristic(s) of a user interface may vary with operating system and/or program.

Process 500 continues with generating a data request including the determined user interface characteristic(s) (operation 512). The data request may, for example, be an HTTP request. Process 500 also calls for waiting for a data response (operation 516). Once a data response is received, process 500 calls for presenting the data in the data response in the user interface (operation 520). Process 500 is then at an end.

Although FIG. 5 illustrates one implementation of a process for data presentation, other processes for data presentation may include fewer, additional, and/or a different arrangement of operations. For example, determining the characteristic(s) of a user interface may be performed before determining that data is needed. As another example, the user interface characteristic(s) may not be conveyed in the data request, especially if they have been determined previously. As an additional example, a process may include modifying textual data received in the data response based on the user interface characteristic(s). As a further example, one or more operations may be performed contemporaneously or even simultaneously.

Various implementations of the described systems and techniques may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural programming language, an object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard (e.g., QWERTY) and a pointing device (e.g., a mouse or a trackball) by which the user may provide input to the computer. Other kinds of devices may be used to provide for interaction with a user as well; for example, feedback provided to the user by an output device may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations for achieving alteration of presentation content have been described, and several others have been mentioned or suggested. Furthermore a variety of additions, deletions, substitutions, and/or modifications to these implementations will be readily suggested to those skilled in the art while still achieving alteration of presentation content. For at least these reasons, the invention is to be measured by the appended claims, which may encompass one or more aspects of one or more of these implementations.

The invention claimed is:

1. A computer-implemented method comprising:
obtaining one or more search results that a search engine has selected as being responsive to a search query, the search results each comprising textual data;
obtaining information that references one or more characteristics of a user interface of a client device;
determining that a particular search result is to be truncated based on one or more of the characteristics of the user interface, comprising:
   determining a maximum desired scroll amount that represents a predetermined, maximum amount that the user wishes to scroll to view a list of the search results, and
   determining that presentation of the search results would require the maximum desired scroll amount to be exceeded;
automatically generating, by one or more processors and in response to determining that the particular search result is to be truncated, a truncated search result using the textual data of the particular search result, wherein generating the truncated search result further comprises:
   establishing, as a first portion of the truncated search result, a first portion of the textual data that the search engine has selected as being most informative, and
   inserting, as a second portion of the truncated search result, a visual indicator in place of a second portion of the textual data, wherein the visual indicator occupies less space on the user interface of the client device than would the second portion of the textual data; and
providing the truncated search result for display on the user interface of the client device.

2. A computer-implemented method comprising:
obtaining one or more search results that a search engine has selected as being responsive to a search query, the search results each comprising textual data;
obtaining information that references one or more characteristics of a user interface of a client device, comprising obtaining information that references a user interface memory amount;
determining that a particular search result is to be truncated based on one or more of the characteristics of the user interface, comprising determining that a particular search result is to be truncated based on the user interface memory amount;
automatically generating, by one or more processors and in response to determining that the particular search result is to be truncated, a truncated search result using the textual data of the particular search result, wherein generating the truncated search result further comprises;
   establishing, as a first portion of the truncated search result, a first portion of the textual data that the search engine has selected as being most informative, and
   inserting, as a second portion of the truncated search result, a visual indicator in place of a second portion of the textual data, wherein the visual indicator occupies less space on the user interface of the client device than would the second portion of the textual data; and
providing the truncated search result for display on the user interface of the client device.

3. A computer-implemented method comprising:
obtaining one or more search results that a search engine has selected as being responsive to a search query, the search results each comprising textual data;
obtaining information that references one or more characteristics of a user interface of a client device, comprising obtaining information that references a predetermined font size;
determining that a particular search result is to be truncated based on one or more of the characteristics of the user interface;
automatically generating, by one or more processors and in response to determining that the particular search result is to be truncated, a truncated search result using the textual data of the particular search result, wherein generating the truncated search result further comprises:
   establishing, as a first portion of the truncated search result, a first portion of the textual data that the search engine has selected as being most informative, and
   inserting, as a second portion of the truncated search result, a visual indicator in place of a second portion of the textual data, wherein the visual indicator occupies less space on the user interface of the client device than would the second portion of the textual data; and
providing the truncated search result for display on the user interface of the client device.

4. A system comprising:
one or more computers; and
a computer-readable medium coupled to the one or more computers having instructions stored thereon which, when executed by the one or more computers, cause the one or more computers to perform operations comprising:
   obtaining one or more search results that a search engine has selected as being responsive to a search query, the search results each comprising textual data;
   obtaining information that references one or more characteristics of a user interface of a client device;
   determining that a particular search result is to be truncated based on one or more of the characteristics of the user interface, comprising:
      determining a maximum desired scroll amount that represents a predetermined, maximum amount that the user wishes to scroll to view a list of the search results, and
      determining that presentation of the search results would require the maximum desired scroll amount to be exceeded;
   automatically generating, in response to determining that the particular search result is to be truncated, a truncated search result using the textual data of the particular search result, wherein generating the truncated search result further comprises:
      establishing, as a first portion of the truncated search result, a first portion of the textual data that the search engine has selected as being most informative, and
      inserting, as a second portion of the truncated search result, a visual indicator in place of a second portion of the textual data, wherein the visual indicator occupies less space on the user interface of the client device than would the second portion of the textual data; and providing the truncated search result for display on the user interface of the client device.

5. A computer-implemented method comprising:

obtaining one or more search results that a search engine has selected as being responsive to a search query, the search results each comprising textual data;

obtaining information that references one or more characteristics of a user interface of a client device;

determining that a particular search result is to be truncated based on one or more of the characteristics of the user interface, comprising determining that a particular search result is to be truncated based on two or more of a display size, a font metric, and a memory constraint of the user interface;

automatically generating, by one or more processors and in response to determining that the particular search result is to be truncated, a truncated search result using the textual data of the particular search result, wherein generating the truncated search result further comprises;

establishing, as a first portion of the truncated search result, a first portion of the textual data that the search engine has selected as being most informative; and inserting, as a second portion of the truncated search result, a visual indicator in place of a second portion of the textual data, wherein the visual indicator occupies less space on the user interface of the client device than would the second portion of the textual data; and providing the truncated search result for display on the user interface of the client device.

6. A computer-implemented method comprising:

obtaining one or more search results that a search engine has selected as being responsive to a search query, the search results each comprising textual data;

obtaining information that references one or more characteristics of a user interface of a client device before receiving the search query;

determining that a particular search result is to be truncated based on one or more of the characteristics of the user interface;

automatically generating, by one or more processors and in response to determining that the particular search result is to be truncated, a truncated search result using the textual data of the particular search result, wherein generating the truncated search result further comprises;

establishing, as a first portion of the truncated search result, a first portion of the textual data that the search engine has selected as being most informative, and inserting, as a second portion of the truncated search result, a visual indicator in place of a second portion of the textual data, wherein the visual indicator occupies less space on the user interface of the client device than would the second portion of the textual data; and providing the truncated search result for display on the user interface of the client device.

\* \* \* \* \*

UNITED STATES PATENT AND TRADEMARK OFFICE
CERTIFICATE OF CORRECTION

PATENT NO. : 8,583,627 B1  
APPLICATION NO. : 11/172639  
DATED : November 12, 2013  
INVENTOR(S) : Maryam Garrett et al.

Page 1 of 1

It is certified that error appears in the above-identified patent and that said Letters Patent is hereby corrected as shown below:

Title Page 2, Column 1 (Other Publications), line 23: please delete "intemet" and insert therefor -- internet --;

Title Page 2, Column 1 (Other Publications), line 31: please delete "interne" and insert therefor -- internet --;

In the Claims

Column 11, line 61, Claim 2, please delete "comprises;" and insert therefor -- comprises: --;

Column 13, line 21, Claim 5, please delete "comprises;" and insert therefor -- comprises: --;

Column 13, line 24, Claim 5, please delete "informative;" and insert therefor -- informative, --; and Column 14, line 18, Claim 6, please delete "comprises;" and insert therefor -- comprises: --.

Signed and Sealed this  
Twenty-fifth Day of February, 2014

Michelle K. Lee  
*Deputy Director of the United States Patent and Trademark Office*